Dec. 30, 1958 T. G. LLEWHELLIN 2,866,572
CLOSURES FOR OPENINGS
Filed Aug. 23, 1954 4 Sheets-Sheet 1

Inventor
Thomas Gerald Llewhellin
By Lucke & Lucke
Attorney

Dec. 30, 1958 T. G. LLEWHELLIN 2,866,572
CLOSURES FOR OPENINGS
Filed Aug. 23, 1954 4 Sheets-Sheet 2
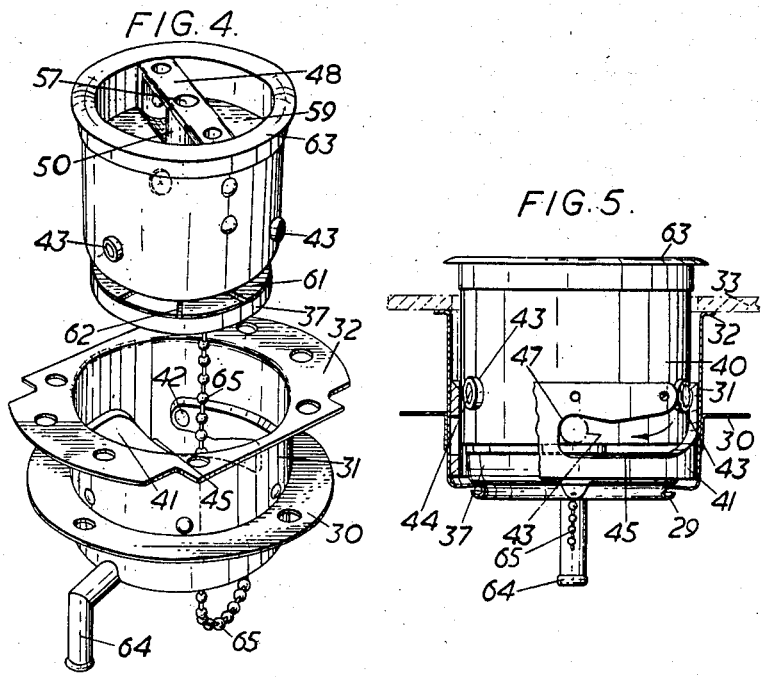
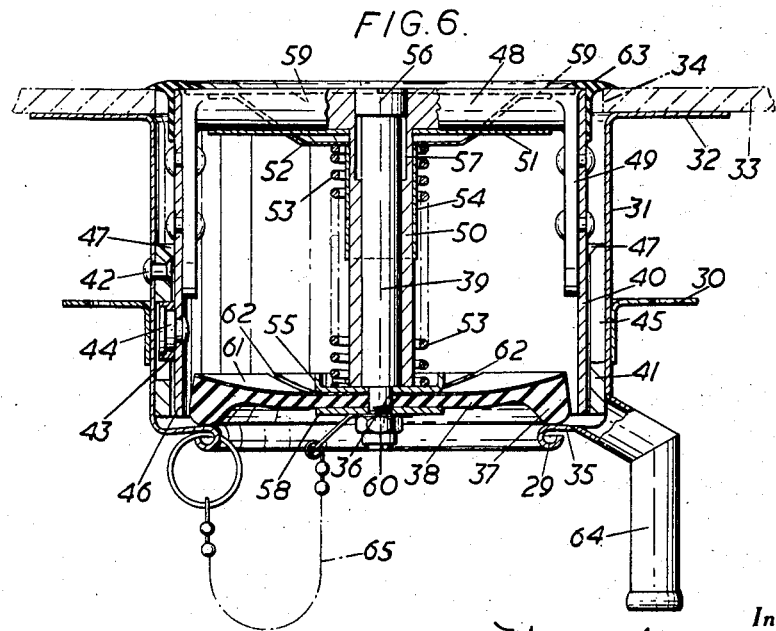
Inventor
Thomas Gerael Llewhellin
By Lucke & Lucke
Attorney Dec. 30, 1958 T. G. LLEWHELLIN 2,866,572
CLOSURES FOR OPENINGS
Filed Aug. 23, 1954 4 Sheets-Sheet 3
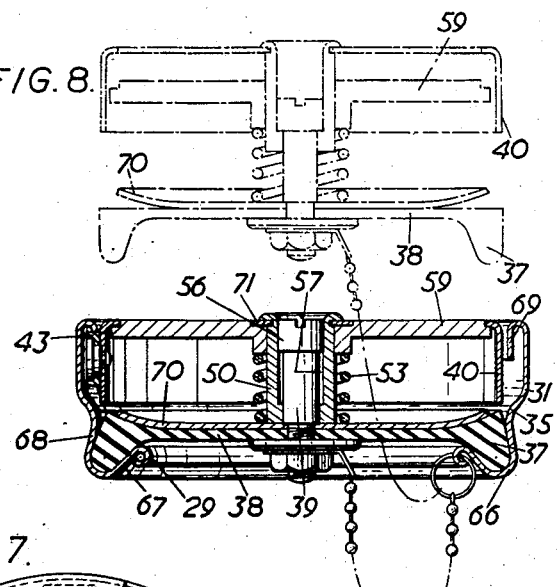
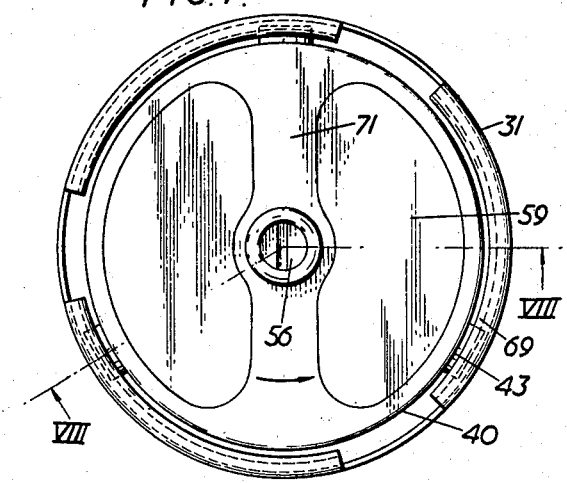
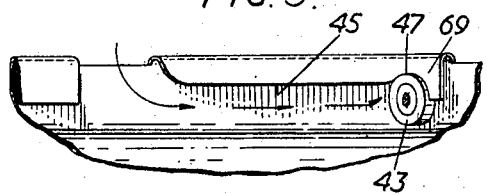
Inventor
Thomas Gerald Llewhellin
By Lucke & Lucke
Attorney Dec. 30, 1958 T. G. LLEWHELLIN 2,866,572
CLOSURES FOR OPENINGS
Filed Aug. 23, 1954 4 Sheets-Sheet 4

FIG.10.

Inventor
Thomas Gerald Llewhellin
By Lucas Luck
Attorney

United States Patent Office 2,866,572
Patented Dec. 30, 1958

2,866,572

CLOSURES FOR OPENINGS

Thomas Gerald Llewhellin, Glasgow, Scotland, assignor to K. A. C. Limited, Glasgow, Scotland, a British company Application August 23, 1954, Serial No. 451,464

Claims priority, application Great Britain August 24, 1953

16 Claims. (Cl. 220—40)

This invention concerns improvements in or relating to closure assemblies for the openings of opening-provided structures, and particularly closure assemblies for the filling openings of containers for fluids, for example liquids such as petrol, fuel oil, lubricating oil and so on. More especially, the invention concerns a closure assembly (or so-called "filler cap" assembly) for the filling opening of a liquid fuel tank of an aircraft. Nevertheless, it will readily be appreciated that a closure assembly according to this invention may also be used on water and other tanks of aircraft, or for other closure purposes as, for example, a closure for inspection openings, and/or the fuel or other tanks of wheel or endless track vehicles such as military vehicles, lorries, tanker vehicles, automobiles, ships, static apparatus or plants, and so on.

One object of the invention is to provide a generally improved closure assembly, whilst another object of the invention is to provide a closure assembly suitable for use (e. g. on aircraft) where a substantially flush fitting of the closure with respect to the surrounding surfaces (e. g. an aeroplane wing surface) is desirable.

According to this invention there is provided a closure assembly, such assembly comprising a housing having, at a position spaced from its upper end, an inwardly directed sealing flange defining an opening; a closure diaphragm for closing this opening; a resilient annular sealing member, ring or rim for making a fluid-tight annular seal between the said diaphragm and the said sealing flange when the diaphragm is introduced into the said housing and pressed towards said sealing flange; a carrier for the said diaphragm and by which the latter is rotatably carried; cooperating fastening means on said housing and carrier for securing the carrier in the housing, said fastening means being of such a form that the securement thereby of the carrier in the housing involves the pressing of said diaphragm towards the said sealing flange with the consequential application of pressure to and the compression of the said annular sealing member, ring or rim to seal said opening, and the rotation of the carrier (independently of said diaphragm) in the housing to lock the carrier in the latter.

The said housing will usually be made separately of the structure, e. g. container or tank, on which it is to be used and usually the housing and the said carrier will both be of generally cylindrical form whilst the said opening and the sealing diaphragm will be of circular form and in this specification these parts will hereinafter be dealt with as if they are of these particular shapes. The separately formed housing may be inserted into, and secured in, the structure of the tank or the skin of an aircraft or the like where it is to be used and the upper end of the housing may have an outwardly extending peripheral flange by which the housing may be secured to said structure by means of screws or the like passing through such flange. Alternatively, as will be obvious, the closure assembly may be applied to the end of a pipe or conduit leading to a remotely fitted fuel or other tank or container.

Preferably the said carrier is attachable to, or detachable from, the said housing by effecting a partial rotation (i. e. a part of a single revolution) only of the carrier about the axis of the said sealing diaphragm and relatively to the said housing. Thus, according to a still further feature of the invention, a bayonet joint form of fastening means is provided for securing the said carrier to the said housing in an attachable and detachable manner, the bayonet slots being arranged circumferentially around the external periphery of the said carrier or around the internal periphery of the said housing and the cooperating-pins or equivalent male elements or parts being arranged around the opposing periphery of the other of these two members (i. e. the housing or the carrier) and the interengagement and disengagement of the cooperating parts of the fastening means being achieved by a partial rotation of the said carrier relatively to the said housing preceded or followed by an axial movement of said carrier with respect to said housing.

The said bayonet joint type of fastening may also be so constructed as to provide for the progressive pressing of the marginal portion of the said sealing diaphragm towards the said inwardly directed flange of the housing as the carrier is being secured to the housing.

According to a still further feature of the invention the said sealing diaphragm may be mounted so as to be capable of axial bodily movement with respect to the said carrier, and resilient means, such as a spring or springs, may be provided for urging the carrier and diaphragm axially apart whereby, when the carrier is being, and is, secured in the housing, the diaphragm is resiliently pressed against the said inwardly directed flange of the housing or a part of or on said flange. Moreover, by reason of the resilient means (e. g. said spring or springs), when the carrier is released from the housing, it is automatically projected partially from the latter so that it may be readily grasped before the withdrawal of the carrier and the sealing diaphragm from the housing, this projection of the carrier also serving as visual indication that the closure is not fastened in a fluid-tight manner.

The said diaphragm may comprise a disc the underside of the peripheral portion of which is adapted to engage the upper part of the said resilient annular sealing member, ring or rim carried by the said inwardly directed flange of the housing, or the reverse arrangement may be adopted, the said resilient annular sealing member, ring or rim being carried by, preferably as an integral part of, the said diaphragm. The said annular sealing member, ring or rim and (where this latter part is formed integrally with the diaphragm) the diaphragm may be formed of a resilient sealing material such as, for example, resilient rubber, oil resistant rubber, synthetic thermoplastic material or like resilient impervious material. Where the annular sealing member, ring or rim is formed integrally with the diaphragm the latter conveniently comprises a disc made of sealing material such as specified above and furnished on its underside, and around its peripheral marginal portion, with a downwardly directed rim which is formed in one-piece with the disc and which is adapted to engage the said inwardly directed flange of the housing.

In either of the said arrangements the said resilient annular sealing member, ring or rim may be adapted to seat in an annular channel provided coaxially on, and conveniently formed integrally with and forming part of, the said inwardly directed flange of the housing and, when the resilient sealing member, ring or rim is formed or provided on the diaphragm itself, it and the said channel preferably are of an inter-wedging character so that the harder the ring or rim is pressed into the channel the tighter is the seal which is made. Moreover, the said channel may have its opposite inner circumferential surfaces of frusto-conical form so that, as the said sealing member, ring or rim on the diaphragm is forced into the channel, the sealing member, ring or rim is expanded or deformed outwardly whereby its natural resiliency is called into play and urges it into still closer engagement with the walls of said channel. The resistance of the said diaphragm to said deformation may, if desired, be supplemented or controlled by the provision of a springy or substantially rigid supporting or backing plate for the diaphragm.

As will be apparent from what has already been said, the arrangement should be such that it is necessary to apply axial pressure to the said annular sealing member, ring or rim in order to be able to commence the rotation of the carrier to bring the said bayonet joint pins or like male elements into the laterally extending portions of the co-operating bayonet slots and, if desired, the said slots may each have that edge thereof which co-operates with its pin or like element of cam form so that, as the carrier is rotated about its axis, the annular sealing member, ring or rim is at first progressively axially compressed, the said laterally extending portion of each of said slots being, however, formed with a depression in its male element-engaging edge near the closed end of the slot, this depression serving to receive the said male element in order to secure the carrier in its fully locked position and against accidental rotation, the reaction of the compressed annular sealing member, ring or rim serving to retain the said male element in the depression in the bayonet slot.

The said carrier may be hollow and have therewithin means, such as a finger bar provided diametrically thereacross, for rotating the carrier about its axis relatively to said housing, and a cover plate may also be provided within the hollow carrier for closing the outer end thereof. This plate may be mounted within the carrier so as to be slidable axially thereof and may have its upper end portion adapted to engage under an inturned flange provided at the upper end of the carrier. Moreover, this cover plate will preferably have a diametrical slot to receive the said carrier rotating means, e. g. the said finger bar, which also prevent the rotation of the cover plate relatively to the carrier. Conveniently the said cover plate may be pressed resiliently upwardly against the said inturned flange of the carrier by means of a helical, volute, or other suitable compression spring located within the carrier.

If desired a drain pipe may be provided from the lower part of the said housing to discharge therefrom any liquid which might enter and collect in the housing on the upper side of the said sealing flange and around the said sealing member, ring or rim.

To prevent the closure from becoming detached from the tubular housing the said cover member may be permanently connected by a chain or equivalent flexible member to the said housing.

In order that the invention may be more readily understood three embodiments of the same will now be described with reference to the accompanying drawings in which:

Figure 4 is a perspective view similar to Figure 1 but showing a modified form of the closure assembly;

Figure 5 is a part vertical section of the closure assembly shown in Figure 4 in a partially closed condition;

Figure 6 is a diametrical vertical cross-section of the closure assembly shown in Figures 4 and 5 fully closed, the figure being drawn to a rather larger scale than Figures 4 and 5;

Figure 7 is a plan of a somewhat modified form of the closure assembly shown in Figures 4 to 6;

Figure 8 is a section on line VIII—VIII, Figure 7;

Figure 9 is a fragmentary view of the upper part of the housing of the closure assembly; and Figure 10 is a view somewhat similar to Figure 6 but showing a slightly modified construction.

Figure 1:
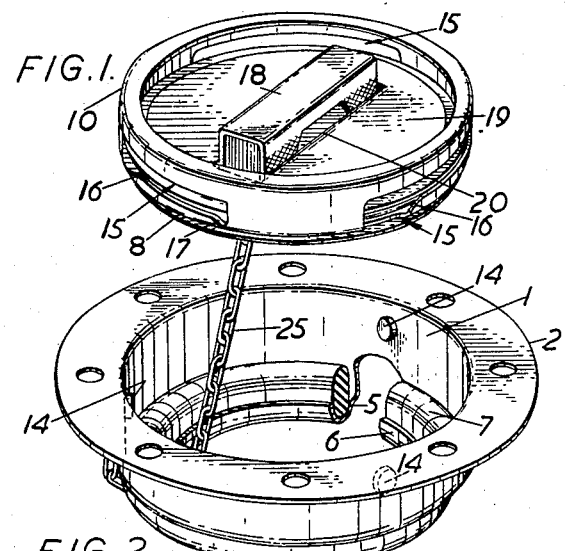
Figure 1 is a perspective view of one closure assembly suitable for the filling opening of a fuel tank of an aircraft or the like and constructed in accordance with this invention, the closure being shown open and partially broken away to illustrate the construction.
Figure 2:
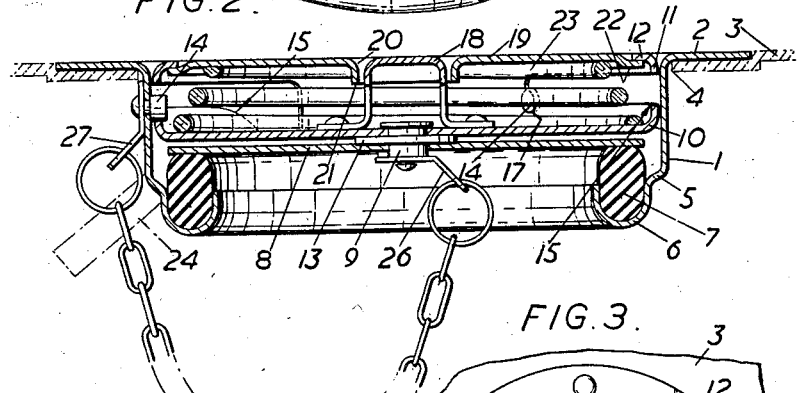
Figure 2 is a diametrical vertical sectional elevation of the closure assembly shown in Figure 1, but in a closed condition and drawn to a rather larger scale than in Figure 1.
Figure 3:
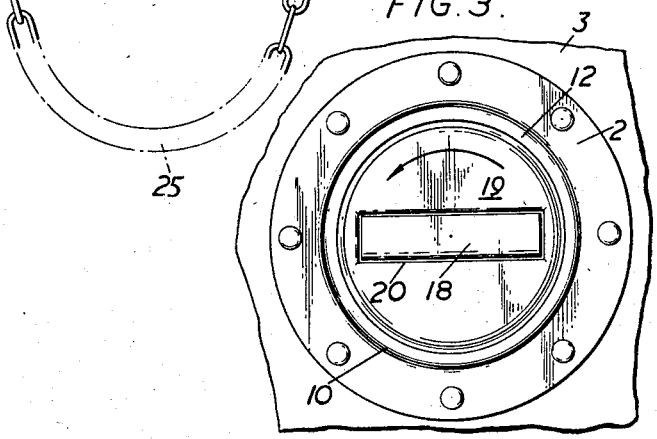
Figure 3 is a plan of the closure assembly shown in Figures 1 and 2.

In the embodiment of the invention shown in Figures 1 to 3, the closure assembly comprises a cylindrical housing 1 which may be formed of sheet metal and which, at its upper end, has an outwardly directed peripheral flange 2 by which it may be secured to the supporting structure, e. g. the wall 3 of an aircraft fuel tank, in which it is to be used, the housing being located coaxially with the opening 4 in the tank and on the inside of the latter.

The lower end of the said cylindrical housing 1 has an inwardly directed annular flange 5 terminating in an integral annular U-shaped sealing channel 6 in which is snugly seated a resilient annular sealing member which is, in this instance, in the form of a ring 7 formed of oil-resistant rubber or other suitable stout resilient liquid impervious sealing material, the ring being rounded at its upper and lower parts (and preferably of approximately oval form in cross-sectional shape) and projecting upwardly beyond the top of the channel 6 which, like the ring 7, is coaxial with the housing 1.

To co-operate with the said sealing ring 7 there is provided a removable circular closure diaphragm 8 adapted to be inserted coaxially into the housing 1 and of such a diameter that, when introduced coaxially into said housing, the diaphragm peripherally overlaps the said sealing flanges and seats peripherally upon the upper edge of the resilient sealing ring 7 so as somewhat to compress the latter and make a fluid-tight joint therewith when subjected to some downward or inward axial pressure. In the example illustrated, the diaphragm 8 is in the form of a disc of metal which may or may not be of a very slightly flexible-springy nature.

The diaphragm 8 is carried rotatably and coaxially upon a pin 9 fixed centrally into the lower end of a cylindrical carrier 10 which is adapted to be inserted into the housing 1 and which is a good but free sliding and rotational fit in this housing.

The carrier 10 is in the form of a shallow hollow cup, the peripheral wall 11 of which is of cylindrical form and is provided at its upper end with an inwardly directed circumferential flange 12.

Between the diaphragm 8 and the lower end of the carrier 10 is arranged a sealing washer 13 to prevent the leakage of any fluid from the tank 3 around the pivot 9 and between the carrier 10 and the upper side of the diaphragm 8.

The carrier 10 is rotatable about the pivot pin 9 relatively to the diaphragm 8, and a bayonet pin and slot type of connection is provided for securing the carrier releasably in the housing 1 with the diaphragm 8 pressed firmly down upon the upper edge of the sealing ring or rim 7.

The said bayonet slot connection conveniently comprises, as shown in the drawings, three rigid pins 14 fixed at equi-angularly spaced intervals of 120° into the peripheral wall of the housing 10 at a position about half way between the upper flange 2 of the housing and the upper edge of the sealing ring 7, all as clearly seen in Figures 1 and 2 of the drawings. The pins 14 project radially inwardly into the housing 1 and constitute the male elements of the bayonet joints whilst the slots 15 constitute the female parts of the joints and are formed in the periphery of the carrier 10, there being three of these slots to correspond in number and positions with the pins 14.

The bayonet slots 15 have their entrances (see Figure 1 located at the lower end of the carrier 10 so that, when this is inserted into the tubular housing 1 with the entrances of the bayonet slots each in register with one of the co-operating pins 14, the latter enter the slots on the carrier being pushed axially further into the tubular housing 1 whereafter rotation of the carrier 10 about its axis relatively to the housing 1 and the diaphragm 8 will cause the pins 14 to pass along the laterally or circumferentially extending portions of the bayonet slots 15 to secure the carrier 10 in the housing 1.

The arrangement of the said bayonet slots 15 and the co-operating pins 14 should be such that it is necessary to apply axial pressure to or axially to compress the sealing ring 7 through the medium of the diaphragm 8 in order to be able to commence the rotation of the carrier 10 about its axis for bringing the pins 14 into the laterally or circumferentially extending portions of the bayonet slots.

Each of the said slots may each have a portion 16 of the lower edge thereof (i. e. that edge which co-operates with the corresponding pin 14), of a cam-like form, so that, during the earlier stages of the rotation of the carrier 10 about its axis relatively to the housing 1 to secure it in the latter, the sealing ring 7 is progressively axially further compressed. The said lower edge of each bayonet slot is also preferably formed with a depression 17 near the closed end of the slot, this depression serving to receive the corresponding pin 14 in order to secure the carrier in its fully locked position and against accidental releasing rotation, the upward pressure of the compressed sealing ring 7 tending to lock the pins 14 in the recesses 17. It will thus be seen that besides acting as a carrier for the closure diaphragm 8, the part 10 also acts as a locking member by which the closure 8 can be secured in its sealing position within the housing 1.

To enable the carrier 10 to be rotated about its axis in inserting the same in the housing 1 or removing it therefrom, the carrier is furnished internally with a diametrically arranged operating or finger bar 18 which may be grasped between the fingers and thumb, the said bar conveniently being in the form of an inverted flanged channel section element riveted to the bottom of the carrier 10, and of rectangular form in plan.

Particularly when the closure assembly is applied to aircraft, it is desirable that it should have a flush finish so as to avoid the creation of eddy currents, dust traps and so forth and also that rain, snow and the like should be excluded from the interior of the closure; therefore a cover plate 19 is provided and is in the form of a disc located within the upper inturned flange 12 of the peripheral wall of the carrier 10 and capable of moving in the axial direction of the carrier, the cover plate having a rectangular slot 20 arranged diametrically across it to accommodate the finger bar 18 and the longitudinal walls of this slot being defined by inwardly plunged or turned portions 21 of the disc. The peripheral edge portion 22 of the cover plate 19 is downwardly joggled so as to fit under the inwardly turned flange 12 of the carrier 10.

In order normally to maintain the cover plate 19 in its uppermost position flush with the upper surface of the inwardly directed flange 12 of the carrier 10 and the surrounding structure, a spring, for example the volutely coiled compression spring 23 shown in the drawing, is arranged within the carrier 10 between the lower end thereof and the cover plate 19 so that the latter is always resiliently urged away from the bottom of the carrier 10 to maintain its periphery in engagement with the inturned flange 12 of the carrier and, if desired, a resilient sealing ring (not shown) may be interposed between the abutting portions of the flange 12 and the cover plate 19.

It will, of course, readily be understood that, when it is desired to rotate the carrier 10 with respect to the housing 1 and consequently to grasp the finger bar 18, it is only necessary to apply light finger pressure to the cover plate 19 and thereby to push it downwardly towards the bottom of the carrier 10, this operation being instinctively carried out in grasping the finger bar. It will also be apparent that, as soon as the finger bar is released, the cover plate 19 returns to its original position. Thus when the carrier 10 is in its sealing position in the housing 1, the upper peripheral flange 2 of the latter, the inwardly directed flange 12 of the carrier 10, the cover plate 19 of the latter and the upper surface of the finger piece 18 will all lie substantially flush with one another, whilst, when it is desired to remove the carrier from the housing 1, the cover plate 19 or disc is pushed downwardly towards the bottom of the carrier so as to expose a sufficient portion of the finger bar 18 to enable the same to be grasped, the carrier 10 is then rotated about its own axis, relatively to the housing 1, in the direction necessary to release the carrier 10 from the pins 14, axial downward pressure being initially applied to the carrier 10 further to compress the sealing ring 7 and to release the pins 14 from the depressions in the ends of the bayonet slots 15 and thereby to permit the initiation of the said rotation or releasing movement of the carrier 10.

If desired a drain pipe may be provided from the lower part of the housing 1 as indicated in dotted lines at 24 to drain away from the housing any liquid which might enter and collect in the latter on the upper side of the said sealing ring and the said diaphragm 8 co-operating therewith. The drain pipe 24 is so arranged as to discharge the liquid outside the tank into which the closure is fitted, a hose being attached to the free end of the pipe 24 if necessary for this purpose.

To prevent the carrier 10 with its diaphragm 8 becoming detached from the housing 1, the former may be permanently attached by means of a chain 25 to the housing as clearly shown in the drawing, one end of the chain 25 being secured to a swivel link 26 on the pivot pin 9 of the carrier and the other end of the chain being anchored to a similar link 27 fixed to the housing 1 on the outside thereof.

In the modification of the invention shown in Figures 4 to 6, the principles of operation of the closure assembly are the same as those of the construction shown in Figures 1 to 3, but the construction is changed primarily in that the sealing ring 7 in this case forms an integral part of a flexible resilient disc-like diaphragm 38 replacing the rigid diaphragm 8 already described, the diaphragm 38 being bodily movable axially relatively to the carrier against spring pressure. Thus, as will be seen from Figures 4 to 6, the closure assembly comprises a cylindrical housing 31 having at its upper end an outwardly turned integral flange 32 by which it may be secured to the supporting structure 33 coaxially with an opening 34 provided therein. A second annular flange 30 may also be provided on the outside of the housing 31 between the upper and lower ends of the latter for further assisting in mounting the housing in the tank or other structure to which it is to be secured.

The lower end of the housing 1 has an inwardly directed sealing flange 35 the inner periphery of which is turned downwardly and under to form a reinforcing bead 29 around the inner edge of the flange on the underside of the housing. The flange 35 forms an annular seating for the lower part of a dependent annular and slightly outwardly diverging annular resilient sealing member which, in this case, is in the form of a rim 37 and forms an integral part of the resilient diaphragm 38, the rim 37 being adapted to seat coaxially upon the flange 35. The diaphragm 38 and its rim 37, which replaces the sealing ring 7 previously referred to, is formed of an oil-resistant or other suitable stout resilient sealing material of sufficient physical strength to maintain its shape and to resist deformation to an appreciable extent whilst rapidly regaining such shape when relieved of deforming pressure. The diaphragm 38 is fixed centrally upon the lower end 36 of a spindle or bolt 39 which is carried coaxially by the carrier 40 of the closure assembly. This carrier is, as in the case described with reference to Figures 1 to 3, of cylindrical hollow form, but is actually deeper than that of the carrier shown in the last mentioned figures to correspond with the deeper form of the housing 31, and is open at both ends.

The carrier 40 is adapted to be introduced into the housing 31 in the same way as the carrier 10 previously referred to is introduced into its housing 1, and to be secured therein by a bayonet joint connection. In this case, however, the carrier is of rather less diameter than the housing 31 and the latter is provided at its lower part internally with an annular anchorage band or ring 41 secured by rivets 42 to the housing 1 and provided with bayonet slots 45 having upwardly directed open ends and lateral branches extending circumferentially around the band 41, the upper edges of these bayonet slots being adapted to co-operate with rollers 43 on fixed radial pins 44 carried at equi-angularly spaced intervals around the carrier 40. Thus the arrangement is such that, to secure the carrier 40 in the housing 31, the rollers 43 are passed through the open upwardly facing mouths of the bayonet slots 45 and are then moved into the laterally extending parts of these bayonet slots, as indicated in Figure 5, by rotating the carrier about its axis relatively to the housing 31, the upper edge of each bayonet slot first inclining downwardly to drive the carrier 40 downwardly further into the housing 31 as it is rotated in the latter, and then inclining upwardly to form a recess 47 at the end of the bayonet slot to locate the corresponding roller 43 against accidental release from the bayonet slot, approximately as previously described with reference to Figures 1 to 3. Thus the upper edge of each bayonet slot is of approximately a wide-angled V-shape so that it progressively decreases in width from opposite ends thereof.

As will be seen from the drawings, there are conveniently three rollers 43 and three corresponding and co-operating bayonet slots 45. The carrier 40 is a good sliding and rotational fit in the bayonet slot-provided band or ring 41, and in addition to the pins 44 being provided with rollers 43 to facilitate the co-operation of the pins with the bayonet slots, the entries or mouths of the latter may be flared to facilitate the introduction of the rollers 43 thereinto.

The lower outer circumferential corner 46 of the carrier 40 and the upper inner circumferential corner 47 of the bayonet slot-provided band 41 may be chamfered to facilitate the entry of the carrier into the said band.

A finger bar 48 is provided diametrically across the upper end of the carrier 40 to enable the latter to be rotated, as hereinbefore described with reference to the carrier 10 and finger bar 18 of the construction shown in Figures 1 to 3, this finger bar 48 having a pair of attachment arms 49 by which it is secured to the inside of the carrier 40 and also having centrally of its length an integral elongated tubular guide boss 50 projecting coaxially into the carrier 40 almost to the lower end thereof.

Within the carrier 40, and on the lower side of the finger bar 48, is located a cover plate 59 which is adapted to close the upper end of the carrier, this cover plate being of substantially circular form and having a diametrical groove or channel 51 to receive the diametrical finger bar 48 within it so that the remainder of the plate normally lies flush with the upper surface of the finger bar and the upper end of the carrier 40 itself.

On the under side of the cover plate 59 is mounted a support plate 52 of dished or hollow truncated conical form, and furnished with a central hole and a tubular coaxial boss 54 surrounding and slidable along the said tubular guide boss 50. The said support plate 52 is pressed upwardly against the under side of the cover plate 59 by means of a helical compression spring 53 surrounding, and coaxial with, the tubular guide boss 50, this compression spring bearing at its upper end upon the under side of the support plate 52 and at its lower end on the base of a rigid cup washer 55 secured on the reduced lower end 36 of the bolt 39 rigidly against a shoulder on this bolt.

The bolt 39 has a cheese head 56 at its upper end and a reduced screw threaded portion at its lower end, the bolt being freely slidable axially in the tubular guide boss 50 and longer than the latter. Moreover, the upper end of the bore of the tubular guide boss 50 is counterbored as shown at 57 to provide an enlarged portion in which the head 56 of the bolt 39 is a free sliding fit and to permit the said tubular boss to slide on the bolt to a limited extent, for example about ½" in the case of a closure in which the carrier is of about 3¼" in diameter.

Between the lower surface of the cup washer 55 and the upper surface of a retaining washer 58 (secured by a nut 60 on the lower end of the said screw threaded portion 36 of the bolt 39), are located a diaphragm supporting or backing plate, conveniently in the form of a spring disc 61, and the rubber or other resilient diaphragm 38 previously described. The rigid cup washer 55, the spring disc 61, the diaphragm 38 and the retaining washer 58 are all clamped tightly upon the reduced end of the bolt 39 and up against the shoulder at the lower end of the latter so as to make a fluid-tight joint between the bolt and the diaphragm 38 but it should be understood that the carrier 40 is rotatable about the bolt 39 relatively to the diaphragm and all the parts associated therewith so as to enable the carrier to be engaged with, or disengaged from, the said bayonet slots.

The disc 61 is conveniently formed of spring sheet metal, such as spring sheet steel, beryllium copper, or other suitable metal and is furnished in at least its outer marginal portion with a plurality of radial slots 62 of elongated keyhole shape having open ends at the periphery of the disc so that the latter is more flexible at the outer marginal portion thereof than at its central portion. This spring disc 61 and the diaphragm 38 are of slightly less external diameter than the carrier 40, as is clear from Figure 6.

It will be appreciated that the upward flexing of the rubber or like resilient diaphragm 38 is restrained to some extent by the spring disc 61 and, by appropriately choosing the material, dimensions, and form of the diaphragm and those of the disc 61, a very good seal between the rim 37 and the flange 35 can be achieved.

The closure described with reference to Figures 4 to 6 operates substantially in the same way as that described with respect to Figures 1 to 3, the carrier being introduced and locked into the housing 31 by inserting it coaxially into the latter, engaging the rollers 43 of the carrier in the open mouths of the bayonet slots 45 and then depressing and subsequently rotating the carrier relatively to the housing 31 so as to move the rollers 43 to the closed extremities of the bayonet slots, whereupon the carrier may be released by the operator. In grasping the finger bar 48 of the carrier, the cover plate 59 is pushed downwardly (against the pressure of the support plate 52 and the helical spring 53) into the position shown in Figure 4. All these parts return to their normal positions when the finger bar is released. In inserting the carrier 40 fully into the housing 41 the rim 37 of the sealing diaphragm 38 is pressed firmly against the inwardly directed flange 35 of the housing 31 and the diaphragm is peripherally deformed or deflected upwardly somewhat against the pressure of the spring disc 61 so that a very close and firm seal is made between the diaphragm and the flange 35, it being appreciated that, when the carrier 40 is locked in the housing 31, the diaphragm and the spring disc 61 are stressed into a somewhat upwardly concave form as indicated in Figure 6 of the drawings and are constantly exerting pressure upon the sealing flange 35.

When the carrier is rotated by the finger bar 48 to secure the carrier in, or release it from, the housing 31, it rotates about the bolt 39 and the diaphragm 37 does not rotate since it frictionally engages the sealing flange 35. It will also be noted that, due to the resilience in the diaphragm 38 and spring disc 61 which tends to push the carrier 40 out of the housing 31, the rollers 43 will snap into the upwardly recessed ends 47 of the bayonet slots 45 when they reach this position.

In order to release the carrier 40 from the housing 41 a series of operations, the reverse of those above described, have to be performed, and it will be appreciated that as soon as the rollers 43 of the carrier are disengaged from the bayonet slots 45, the carrier will, if downward manual counter pressure is not applied thereto, be projected by the combined action of the diaphragm 38, spring disc 61, and spring 53 upwardly and partially out of the housing 40 for the purposes already explained.

As with the Figures 1 to 3 construction, a drain pipe 64 may be provided and also a restraining chain 65 to prevent the complete disconnection of the carrier 40 from the housing 31. Moreover, an annular seal 63 of T-shaped cross-section may be provided at the outer part of the carrier 40, this seal having its cylindrical flange portion engaged around the upper end of the carrier and having its peripheral flanges respectively projecting outwardly over the supporting structure 33 and inwardly over the upper periphery of the cover plate 59 to make a seal between the periphery of this plate and the wall of the carrier 40.

The embodiment shown in Figures 7, 8 and 9 is somewhat of a combination of those shown in Figures 1 to 3 and Figures 4 to 6. As it operates, with certain small exceptions, in almost an identical manner to the construction shown in Figures 4 to 6, only the differences between the latter construction and that shown in Figures 7 to 9 will be described in detail. Thus, as will be seen, the housing 31 is shallower than that shown in Figures 4 to 6 and the flange 35 is furnished with an inwardly and upwardly facing annular sealing channel 66 resembling the channel 6 of the Figures 1 to 3 construction but having its inner and outer peripheral surfaces 67 and 68 of frusto-conical form although coaxial with the housing 31, the said two surfaces having a different apex angle, the outer surface 68 being of a considerably narrower angle than the inner surface 67. In the example shown the apex angle of the conical surface 68 is about 30° whilst that of the inner conical surface 67 is about 92°. Thus the inner and outer surfaces 67 and 68 are mutually upwardly diverging at about an angle of 31° relatively to one another.

The annular dependent rim 37 of the sealing diaphragm 38 is adapted to fit tightly into the upwardly divergent channel 66 when the carrier 40 is inserted fully into the housing 31, the rim 37 thus being somewhat expanded outwardly and displaced upwardly so that due to the substantial resilient resistance of the rim and diaphragm to distortion and the compression of the rim with the channel, a very firm seal is made, this sealing being effected not only at the rounded lower edge of the rim of the sealing diaphragm but also along the inside surface 67 of the channel 66 and partially up the inclined conical surface 68 of this channel. In this construction the spring plate 61 is replaced by a substantially rigid upwardly concave saucer-shaped plate 70 which limits the upward flexing of the sealing diaphragm 38.

Another modification in the Figures 8 to 9 construction resides in forming the finger bar of the carrier 40 as an integral part 71, the cover plate 59 being diametrically recessed to receive it when the cover plate is in its uppermost position.

Moreover, the bayonet slots 45 are also provided by the under edge of an inwardly down-turned flange 69 provided at the upper end of the housing 31, instead of by providing a separate bayonet slot-provided band such as 41 as in the Figures 4 to 6 construction.

It will be readily understood that, where the sealing diaphragm has an integral annular dependent rim as described, for example, with reference to the construction of Figures 4, 5 and 6, or the construction of Figures 7, 8 and 9, and providing the external dimension of this rim closely approximates to the internal dimension of the part of the housing adjacent to which the outer periphery of the rim of the diaphragm lies when in its sealing position, then any internal gas pressure developing in the tank, or other structure to which the closure assembly is fitted, will have the effect of expanding the rim more or less radially outwardly into sealing contact with that part of the housing surrounding said rim so that the greater the internal pressure in the tank or other structure the tighter will the seal become.

In the construction of Figures 4, 5 and 6 the rim of the diaphragm 38 is not closely adjacent to the housing 31 and consequently additional sealing due to the expansion of the rim of the diaphragm under pressure of gas developed inside the tank or other structure will not occur.

In the modified construction illustrated in Figure 10, the lower end of the housing 31 is extended downwardly below the end of carrier 40 and is then reduced in diameter to produce a short coaxial cylindrical extension 75 at the lower end of which a flange 76 is provided, similar in form to the flange 35 seen in Figure 6. The rim 37 of the sealing diaphragm 38 is adapted to seat coaxially on the flange 76 with its outer periphery closely adjacent the inner surface of extension 75. Internal pressure developed in the tank or other structure will cause the rim 37 to expand into sealing contact with the inner surface of cylindrical extension 75.

Although the above described closure assemblies are shown in the drawings with their axes in a vertical direction, it will be appreciated that the closure assembly according to this invention could be used in any position. Thus the words "upper" and "lower," etc. have merely been used herein for convenience of description and are intended to cover a closure assembly however orientated.

I claim:

1. A flush-fitting closure assembly comprising a cylindrical housing, an annular flange extending inwardly from the open lower end thereof, a resilient diaphragm having a peripheral sealing member integrally projecting downwardly therefrom, a hollow cylindrical carrier for said diaphragm, coaxial means rotatably connecting said diaphragm to said carrier, a backing plate disposed coaxially between said diaphragm and said carrier, means disposed within the upper end of said carrier for rotation thereof within said housing, a cover plate releasably disposed within said carrier to close the upper end thereof, resilient means effecting closure of said cover plate, means for releasably securing said carrier to said housing comprising bayonet slots circumferentially disposed in one of said members adapted to receive cooperating male elements disposed on the other of said members, whereby engagement of said male elements in said slots forces said diaphragm into sealing engagement with said flange to seal said opening during depressed rotation of said carrier relative to said housing and said diaphragm.

2. A flush-fitting closure assembly according to claim 1 having a diametrically disposed bar operating said coaxial resilient means for rotation of said carrier relative to said diaphragm about the axis thereof while maintaining free vertical movement of said carrier relative to said diaphragm and wherein said closure means for said cover plate is disposed within said carrier.

3. A flush-fitting assembly according to claim 2 wherein said coaxial connecting means comprises a bolt mounted in limited endwise sliding relationship to said carrier, and having spring means operative on said bolt urging separation of said diaphragm from said carrier.

4. The closure assembly of claim 3, wherein said backing plate is substantially of rigid upwardly bowed saucer form.

5. A closure assembly according to claim 3 having means for effecting a seal in closed position between the open ends of said carrier and said interlocked housing, and between said carrier and said cover plate.

6. A closure assembly according to claim 3 having means for draining liquid collecting in said housing around the channel formed by said annular flange.

7. A closure assembly according to claim 2 wherein said coaxial resilient means connects said diaphragm to said carrier affording rotation of said carrier relative to said diaphragm while resiliently urging said members apart, said backing plate restrains upward flexing of said diaphragm under axially applied sealing pressure and said diaphragm is provided with a sealing rim.

8. A flush-fitting closure assembly comprising a hollow cylindrical housing having an annular sealing flange extending inwardly from the lower end of said housing defining a circular opening therein, a circular resilient diaphragm having an integral annular sealing member projecting peripherally downwardly therefrom, a hollow cylindrical carrier for said diaphragm, coaxial resilient means rotatably connecting said carrier to said diaphragm while maintaining free vertical movement of said carrier relative to said diaphragm, a backing plate disposed coaxially between said diaphragm and said carrier, a rotating bar diametrically disposed within the upper end of said carrier, a cover plate releasably disposed within said carrier for closure of the upper end thereof, resilient means effecting closure of said cover plate while permitting inward displacement thereof, bayonet slots circumferentially disposed in said housing, angularly spaced male elements disposed on said carrier for cooperation with said slots, said slots and said elements disposed in spaced relationship, whereby engagement of said male elements in said slots forces said diaphragm into sealing engagement with said flange to seal said opening during depressed rotation of said carrier relative to said housing and said diaphragm.

9. A closure assembly according to claim 8, wherein the diameter of said annular sealing member is such that it lies closely adjacent said annular flange whereby internal pressure will further expand said annular sealing member outwardly against said annular flange to improve the seal between said diaphragm and said housing when internal pressure is developed in a structure to which the closure assembly is fitted.

10. A flush-fitting closure comprising a hollow substantially cylindrical housing having an annular flange extending inwardly from the wall of said housing and spaced from the upper end thereof, a substantially cylindrical member for rotatably carrying a resilient diaphragm, said diaphragm provided with an annular integral resilient bead for sealing said diaphragm to said flange, cooperating fastening means for detachably securing said member to said housing, said fastening means comprising a plurality of angularly spaced male members disposed on said member for engagement with a plurality of correspondingly spaced circumferential bayonet slots in said housing, said fastening means constructed and arranged upon interlocking engagement thereof to stress said diaphragm in sealing engagement between said bead and said flange, and means for positionally securing said closure to a related structure.

11. A flush-fitting closure according to claim 10 in which said annular flange comprises a channel having inner and outer mutually diverging annular walls, each of said walls being of upwardly convergent frusto-conical formation and in which said annular head is provided with the same cross sectional formation as said channel.

12. A closure assembly comprising a housing, a carrier, a diaphragm, means disposed on one end of said carrier for rotatably mounting said diaphragm, a sealing rim extending peripherally downwardly from said diaphragm, an annular seating adapted to engage said rim, cooperating means on said carrier and said housing for locking said rim in seating engagement with said opening, a backing plate adapted to control flexing of said diaphragm and wherein increased internal pressure in said closure tightens said seal against said seating.

13. A closure assembly according to claim 12 wherein said seating is of concave cross-sectional formation, said sealing rim is resiliently deformable and adapted under pressure to flex upwardly in said seating tightening the fluid tight seal between said closure diaphragm and said seating in direct proportion to internal pressure.

14. A closure assembly for a structure comprising a hollow cylindrical housing provided with an annular portion extending inwardly from the open lower end thereof, an annular seating on said annular portion defining a circular opening in said housing, a circular resiliently deformable diaphragm adapted to close said opening, an integral circular sealing rim projecting peripherally downward from said diaphragm adapted to seat in said seating and lie adjacent the outer peripheral wall thereof, coaxial means rotatably connecting said diaphragm to a cylindrical carrier therefor serving to rotate said carrier relative to said diaphragm, an upwardly bowed backing plate coaxially disposed between said diaphragm and said carrier, interlocking means releasably securing said carrier to said housing serving to flex said backing plate and force said rim into engagement with said seating to seal said opening, whereby internal pressure developed within said structure increases the upward flexing of the periphery of said diaphragm against said plate and the outward expansion of said rim against the peripheral wall of said seating.

15. A flush-fitting closure according to claim 14 wherein said backing plate is rigid.

16. A flush-fitting closure comprising a hollow substantially cylindrical housing having an annular flange provided with a channel extending inwardly from the wall of said housing and spaced from the upper end thereof, a substantially cylindrical member for rotatably carrying a diaphragm, annular resilient sealing means adapted to seal said diaphragm to said flange and seat in said annular channel, cooperating fastening means on said member and said housing for detachably securing said member to said housing, said fastening means comprising a plurality of angularly spaced male elements disposed on said member for engagement with a plurality of correspondingly spaced circumferential bayonet slots in said housing, said fastening means constructed and arranged upon interlocking engagement thereof to stress said diaphragm in sealing engagement between said annular sealing means and said channel.

References Cited in the file of this patent

UNITED STATES PATENTS

| 2,164,450 | Eshbaugh et al. | July 4, 1939 |
| 2,263,653 | Smith | Nov. 25, 1941 |
| 2,281,145 | Duey | Apr. 28, 1942 |
| 2,416,637 | Minella | Feb. 25, 1947 |
| 2,517,372 | Ambrose | Aug. 1, 1950 |
| 2,528,791 | Scoville | Nov. 7, 1950 |
| 2,582,209 | Smith et al. | Jan. 8, 1952 |
| 2,591,767 | Andres | Apr. 8, 1952 |
| 2,675,142 | Spayd | Apr. 13, 1954 |
| 2,732,971 | Holmes et al. | Jan. 31, 1956 |
| 2,733,831 | Nehls | Feb. 7, 1956 |

FOREIGN PATENTS

| 733,195 | France | July 4, 1932 |